United States Patent [19]

Hoover et al.

[11] 4,430,057

[45] Feb. 7, 1984

[54] CALCINER SCREW CONSTRUCTION

[75] Inventors: Donald P. Hoover, Lansdale; Michael A. Csapo, Wyncote; Ernst A. Siemssen, Gwynedd, all of Pa.

[73] Assignee: Selas Corporation of America, Dresher, Pa.

[21] Appl. No.: 349,846

[22] Filed: Feb. 18, 1982

[51] Int. Cl.³ .......................... F27D 3/08; F26B 9/18; F26B 11/12; B65G 33/06
[52] U.S. Cl. ..................................... 432/154; 34/179; 198/498; 198/663; 432/139
[58] Field of Search .................. 432/139, 154; 34/179; 198/498, 662, 663

[56] References Cited

U.S. PATENT DOCUMENTS 4,256,453 3/1981 Csapo ................................. 432/239
4,330,032 5/1982 Koppelman et al. ............... 432/235

FOREIGN PATENT DOCUMENTS 2830491 2/1979 Fed. Rep. of Germany ...... 198/662
1146775 3/1969 United Kingdom ............... 198/662

*Primary Examiner*—John J. Camby
*Attorney, Agent, or Firm*—Austin R. Miller

[57] ABSTRACT

In a calciner of the type having a radiant heat source and a screw conveyor for advancing material to and through a calcining reaction chamber by means of mated, intermeshing, rotating conveyor screws, an improvement comprising scraper means attached to and rotating with the conveyor screws for preventing agglomeration of material in the conveyor and for absorbing heat and conducting the heat to the material and lifter means attached to and rotating with the conveyor screws for increasing exposure of the material to the radiant heat and for absorbing heat and conducting the heat to the material.

19 Claims, 15 Drawing Figures

CALCINER SCREW CONSTRUCTION

This invention relates to a calciner for particulate material and more particularly to a calciner having a novel conveyor screw construction with scrapers and lifters which permits efficient high temperature calciner operation with maximum efficiency and economy.

PRIOR ART

Calciners, or calcining furnaces, for driving volatile substances from materials by heating the materials, having a multiplicity of screw conveyors arranged longitudinally in a calcining chamber are known. In U.S. Pat. No. 4,256,453 a calciner is shown having an improved screw construction with a bearing-mounted, internally cooled support shaft. This calciner with improved screw construction has been generally highly successful. However, where the screw construction conveyances the material by means of multiple screws provided in mated pairs, the screws in each pair intermeshing with each other and rotating in opposite directions, as is commonplace in such conveyancing equipment, problems continue to exist in processing material through the calciner. Materials to be calcined which contain relatively large amounts of water of hydration entering the reaction chamber may agglomerate and adhere to the shafts and screw flights of the conveyor screws, resulting in caking of material within and on the conveyor screws. Such caking exposes the conveyor screws to excessive heat, resulting in reduced conveyor screw life and reduced throughput of material. In extreme situations, caking may cause jamming and shutdown of the conveyor. Material being processed through the calciner also tends to accumulate in the lower portion of the trough through which it is conveyed. The material is not evenly exposed to the heat of the calciner, particularly that material directly below the conveyor screw shaft.

These and other problems inherent in the prior art devices are solved by the device disclosed herein, preferred embodiments of which will be further explained in conjunction with the following detailed description and appended drawings.

DETAILED DESCRIPTION OF A PREFERRED EMBODIMENT

Specific terms will be used hereinafter in the detailed description for the purpose of describing the invention. However, the use of such specific terms should in no way limit the scope of the invention, which scope is defined in the appended claims.

Figure 1:
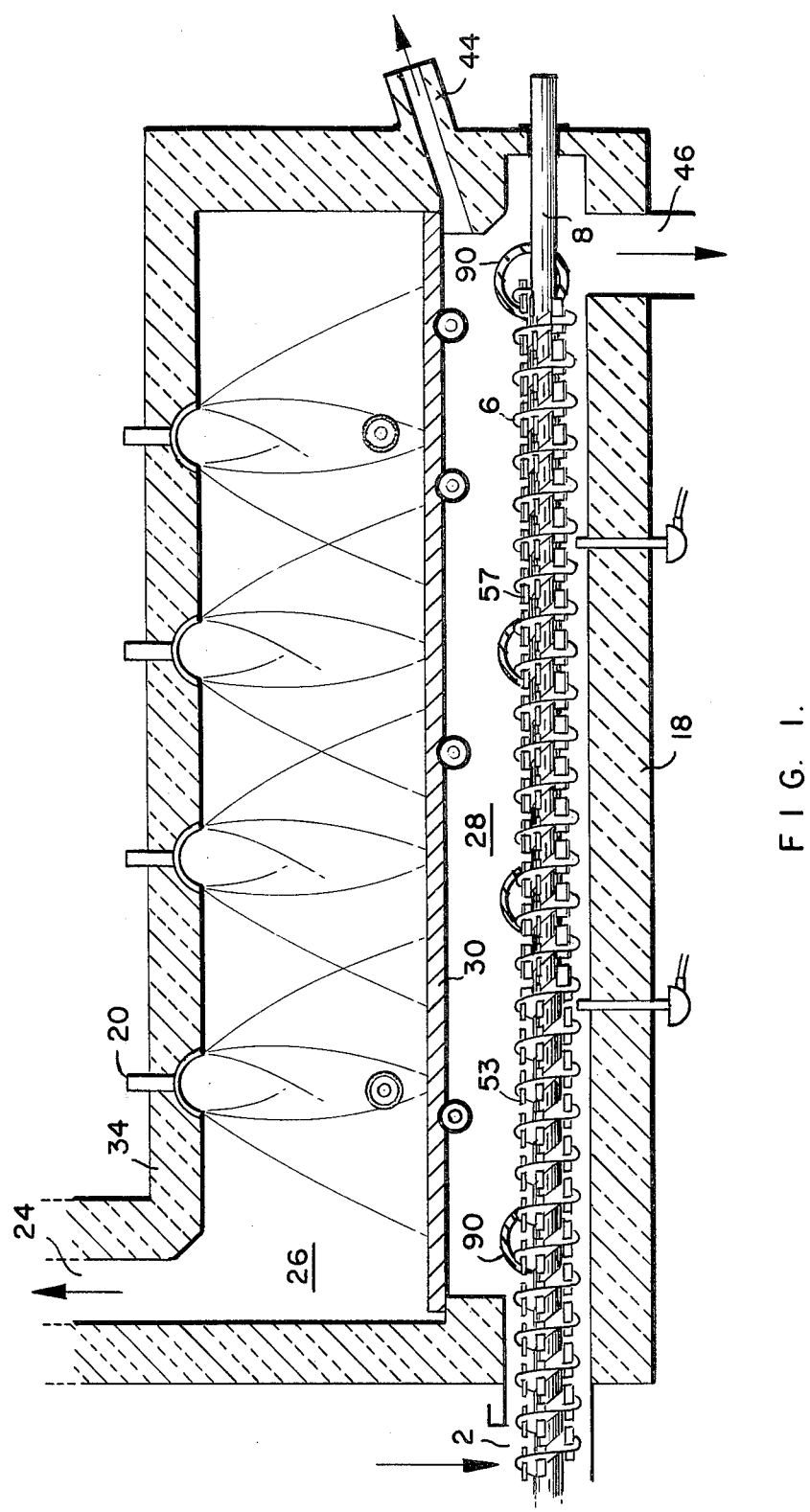
FIG. 1 is a longitudinal sectional view of a calciner in accordance with the invention.

With reference to FIG. 1 of the drawings, there is shown in longitudinal sectional view, a calciner in accordance with the invention. The calciner comprises feed port 2 into which the material to be calcined is admitted. The calciner is divided into heating chamber 26 and reaction chamber 28 by means of a muffle 30. Although muffle 30 is hereby shown and described as partitioning the calciner into a heating zone and a reaction zone, it is noted that the inventive features herein disclosed may be utilized regardless of whether such a muffle is provided in the calciner.

Heating zone 26 is heated by means of a plurality of fuel burners 20, shown in roof 34, but which may also be installed in side walls, which burners may be adapted for either oil or gaseous fuel consumption. Flue 24 extending through roof 34 of the calciner provides escape for the waste gases emanating from the burners 20. Flue 24 may be located at other positions suitable for providing escape for waste gases, such as at mid-kiln. Reaction zone 28 is heated by radiation from the heating zone 26. In this respect, it is important that the muffle 30, which separates the heating and reaction zone be composed of highly thermally conductive materials. It is to be noted that although fossil fuel burners are shown in the drawings, the inventive features herein described are readily utilized in conjunction with other heating devices such as electrical heating means and the like.

Exit port 46 is provided along the hearth 18 for discharge of the calcined material after it has been transported through the calciner by the screw flights 6 on shaft 8. Exit gas port 44 is provided for discharge of the calcining reaction gas, which gas, in most cases, may comprise either carbon dioxide, air, inert gas, water vapor or sulfur dioxide or mixtures thereof. Ports 90 are provided in one of the longitudinally extending sidewalls and may be used for introduction of sweep air. Of course, the positioning of ports 44 and 90 may be reversed.

In practice, multiple pairs of screw assemblies are generally provided in the calciner. The flight pitch of one screw in the pair is opposite from that of the other screw in the pair and the screw flights of each respective screw intermesh with those of the other screw in the pair so that the desired material to be calcined is advanced through the calciner when the screws are rotated in opposite directions.

In accordance with the invention, scrapers 53 are mounted on screw flights 6 in the upstream portion of reaction zone 28. Lifters 57 are mounted on screw flights 6 in the downstream portion of reaction zone 28. However, scrapers 53 and lifters 57 may be used separately for special processing needs. The mounting of scrapers 53 and lifters 57 on the screw flights greatly improves the efficiency of the calciner by reducing caking of the material being processed, by exposing the material to the heat produced by burners 20 more effectively and by conducting heat to the material.

Figure 2:
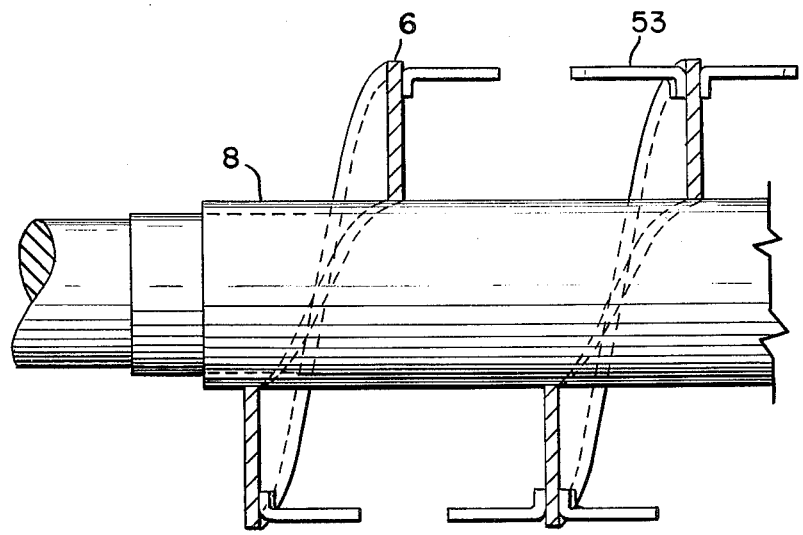
FIG. 2 is a longitudinal sectional view of a portion of a conveyor screw having scrapers in accordance with the invention.
Figure 3:
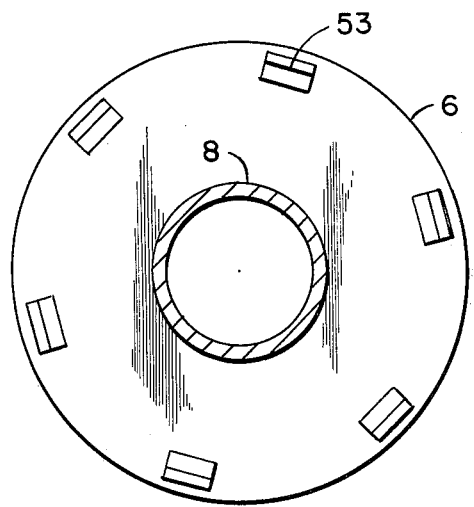
FIG. 3 is a cross sectional view of a portion of a conveyor screw having scrapers in accordance with the invention.

The scrapers 53, as shown in FIGS. 2 and 3 are substantially L-shaped plates attached to screw flights 6, extending axially outwardly from the screw flights near the outer edge of the screw flights. Each scraper 53 extends about one-third the distance of the pitch of the screw as measured at the outer edge and preferably extends about 10° to about 14° of the circumference of the conveyor screw in width, more preferably about 12° to 13° of the circumference of the conveyor screw in width, to permit proper mating of paired screws. The scrapers are mounted about ⅛" from the edge of the screw flights to reduce screw torque.

Multiple scrapers are located on the outer edge of screw flights. The scrapers are preferably located at 60° intervals about the screw flights as shown in FIG. 3, although other configurations which result in proper screw mating may be used.

Figure 4:
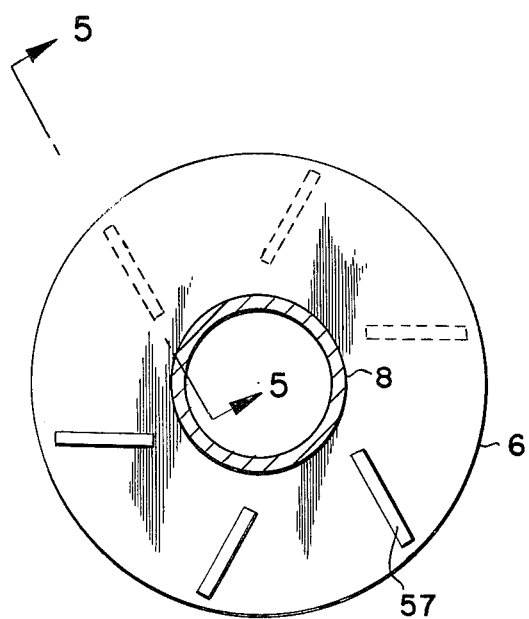
FIG. 4 is a cross sectional view of a portion of a conveyor screw having lifters in accordance with the invention.
Figure 5:
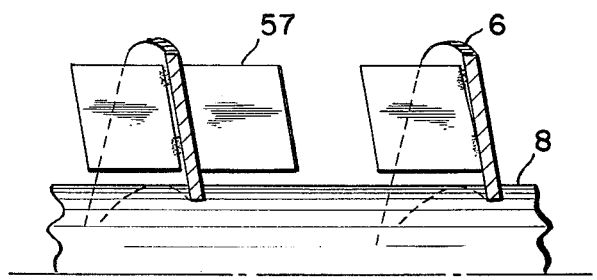
FIG. 5 is a longitudinal sectional view of a portion of a conveyor screw taken along line 5—5 of FIG. 4.

The lifters 57, as shown in FIGS. 4 and 5, are substantially rigid flat vanes attached to screw flights 6, tangential to the inside circumference of the screw shaft 8, extending outwardly from the screw flights about one-third the distance of the pitch of the screw. Each lifter is spaced from the screw shaft 2 and the outer edge of the screw flights 6. The lifters are preferably spaced from about ¼" to about 1" from the screw shaft 2 and spaced about ⅛" from the outer edge of the screw flight. The tangential angle of attachment and the placement at approximately ⅛" from the outer flight edge are important for proper material handling and screw mating with the other conveyor screw of the pair. The proper positioning of the lifters is also desirable for reduction of frictional torque.

Figure 7:
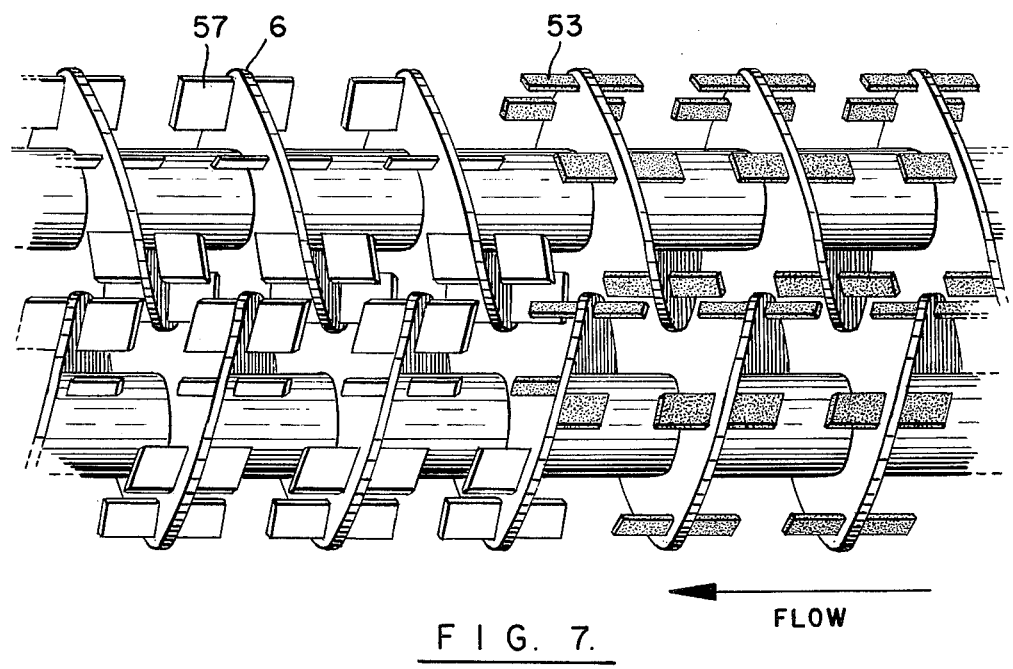
FIG. 7 is a top view of a portion of conveyor screws in accordance with the invention.

To optimize the efficiency of the conveyor screw of the present invention, scrapers or scrapers and lifters should preferably be mounted on the conveyor screw flights at the 60° intervals along the entire length of the conveyor screw on both front and rear faces of the conveyor screw flights as shown in FIGS. 1 and 7. Where the material to be processed has an excessively high bound and free water content and continues in a sticky state through the calciner, scrapers may be provided on conveyor screw flights from the upstream or feed end of the calciner through the downstream or discharge end of the calciner. Where the calciner is able to liberate the bound and free water from the material to be processed prior to the point where the material reaches the downstream portion of the calciner, it is preferable to mount scrapers on the conveyor screw flights at the upstream portion of the conveyor screw and lifters at the downstream portion of the conveyor screw as shown in FIGS. 1 and 7. Conveyor screws may also be provided with lifters only on the screw flights from the upstream to downstream end of the conveyor where the moisture content of the material is such that caking does not occur.

Figure 6:
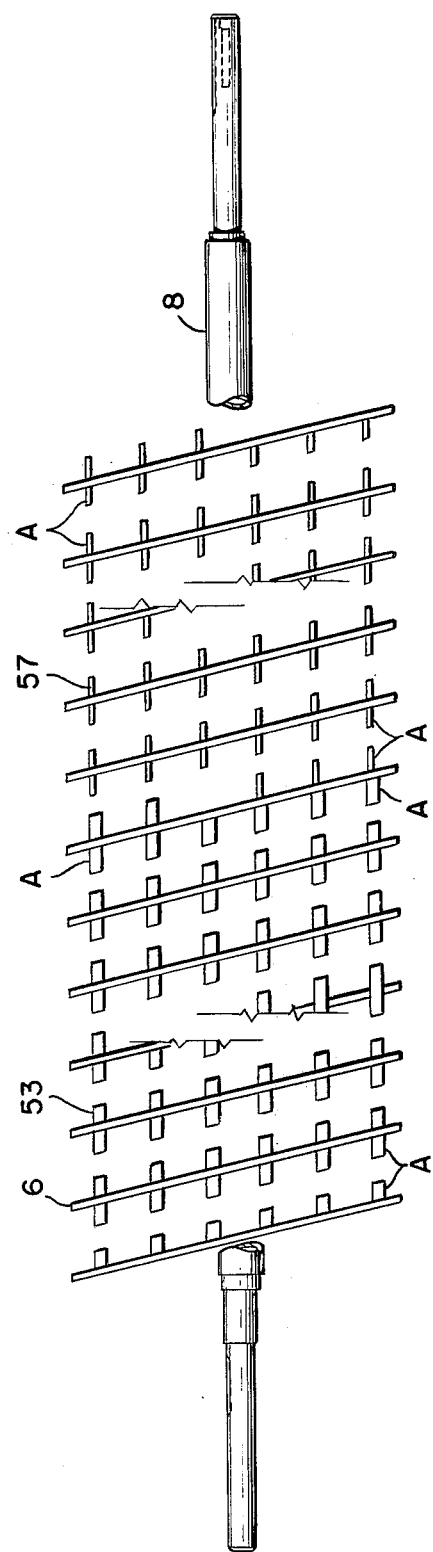
FIG. 6 is a longitudinal schematic diagram of portions of a conveyor screw in accordance with the invention showing the lifters and scrapers in a manner which demonstrates relative positions.

FIG. 6 schematically shows the alignment of the scrapers 53 and lifters 57 in a preferred embodiment of the invention. In a preferred embodiment of the invention, the scrapers 53 and lifters 57 are mounted at 60° intervals about the circumference of the screw flights. When viewed from the end of the conveyor screw, each row of lifters designated A in FIG. 6 are in a straight line and parallel to the center line of the conveyor screw. This alignment of the scrapers and lifters permits proper intermeshing of the paired conveyor screws.

The paired conveyor screws intermesh as shown in FIG. 7. FIG. 7 is a top view of a portion of the intermeshed conveyor screws in accordance with the invention and shows the way in which scrapers 53 intermesh on the portion of screw flights on the right of FIG. 7 and the way in which lifters 57 intermesh on the left of FIG. 7.

A further essential feature of the scrapers and lifters is to provide additional means for conducting heat to the material being processed in the calciner. As the conveyor screws rotate, the scrapers and lifters move from positions in the upper portion of reaction chamber 28 where they are heated by the radiant heat emanating from burners 20 in heating chamber 26 through muffle 30 to positions in the lower portion of reaction chamber 28 where the heat is carried to the material being processed in the calciner. This additional conduction of heat to the material being processed greatly enhances the efficiency of the system.

Figure 8:
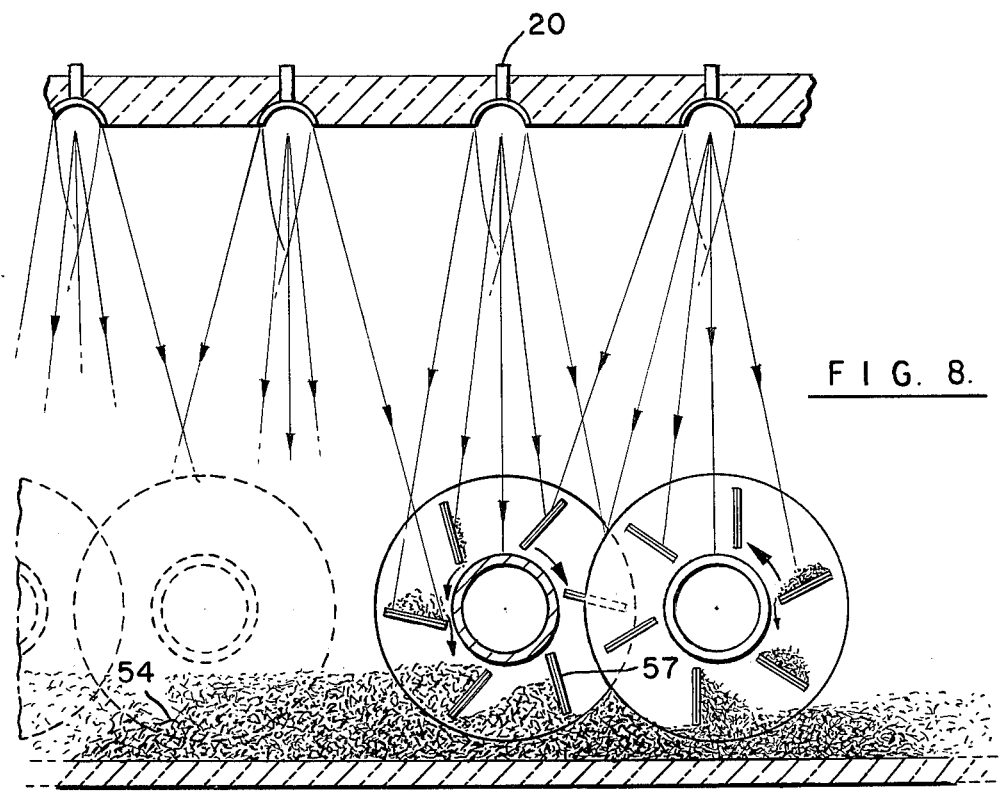
FIG. 8 is a cross sectional view of a calciner in accordance with the invention with portions removed for clarity.

In the calciner of the present invention wherein scrapers and lifters have been mounted on the screw flights, the material is moved within the screw conveyor with such added exposure to the calciner heat that the efficiency of the system is greatly improved. Where scrapers 53 are located along the periphery of the screw flights 6, the scrapers act to prevent caking on the conveyor screws and to circulate material from the lower portion of the trough in which it is being conveyed to the upper portion for increased heating by the radiant heat produced by burners 20. In addition, heat is conducted to the material through contact with the scrapers 53 which are also heated by the radiant heat produced by burners 20.

Where lifters 57 are mounted on screw flights 6 as shown in FIG. 8, the lifters act to lift material 54, from the trough through which it is being conveyed, upward for better exposure to the radiant heat provided by burners 20 as shown in FIG. 8. As the conveyor screws rotate, material 54 is lifted from below the conveyor shaft in the trough. As the rotation continues the material is lifted to a point where the radiant heat from burners 20 may readily heat the material. As rotation further continues beyond the point where the lifter 57 is horizontal, material cascades from lifter 57 through the space between lifter 57 and screw shaft 8 causing a mix or stirring effect. The rotation of the conveyor screw then brings lifter 57 into the upper portion of reaction chamber 26 where radiant heat is absorbed by the lifter 57. Continued rotation of the conveyor screw brings lifter 57 into contact with the material in the trough, conducting heat into the material. The presence of lifters on the screw flights 6 can increase the exposed area of the material in the calciner as much as about 100%.

Figure 9:
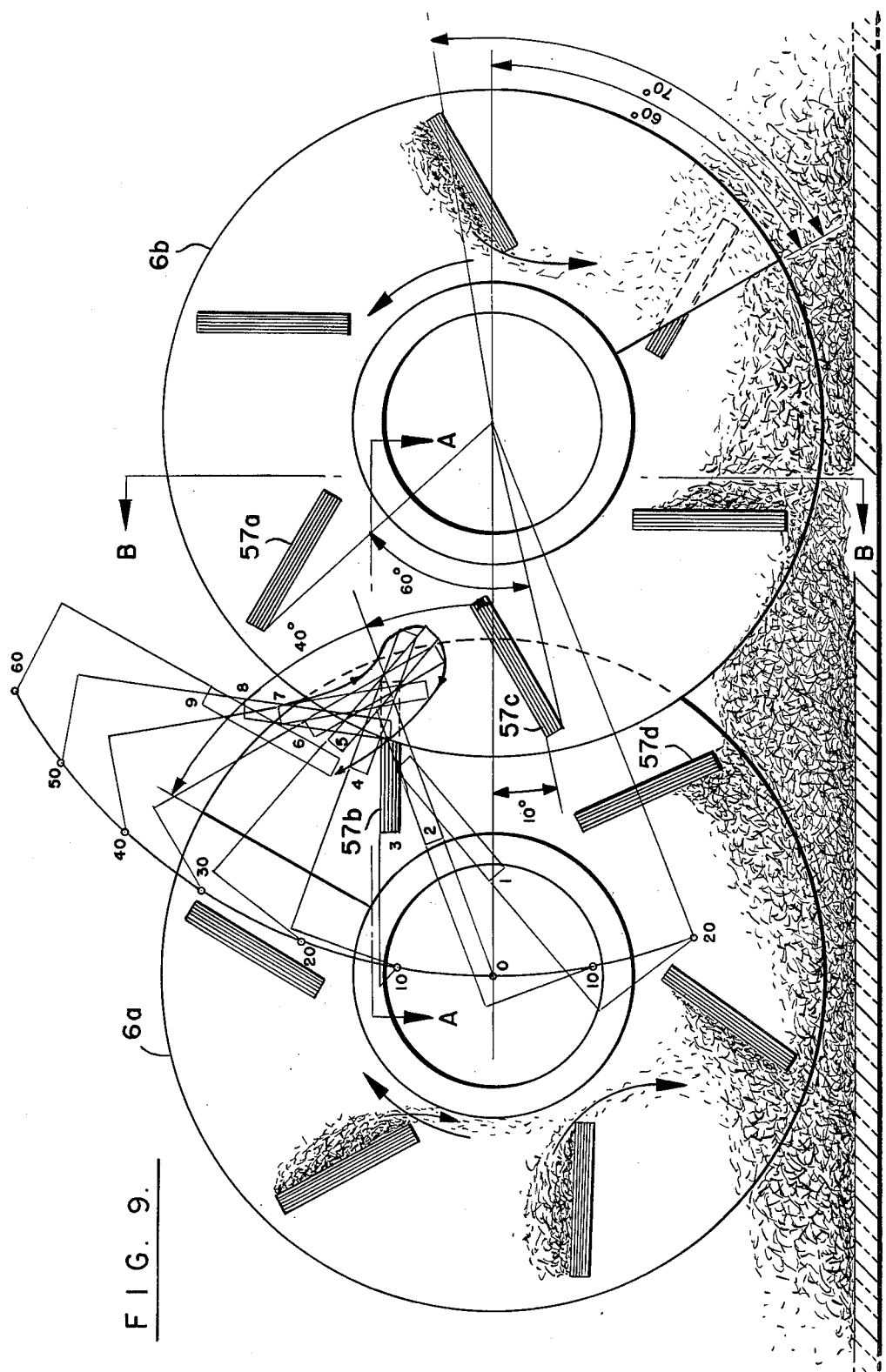
FIG. 9 is a cross sectional view of conveyor screws in accordance with the invention showing schematically the relative motion of a lifter at the flight overlap.

The relative motion of a lifter 57b at the flight overlap is shown in FIG. 9. The relative motion of lifter 57b demonstrates the tumbling or paddle action exerted on the material being processed in the calciner. To demonstrate this action the axis of screw flight 6a is rotated about the axis of screw flight 6b. The position of lifter 57b is shown as the axis of screw flight 6a is rotated about the axis of screw flight 6b at 10° intervals. Where the axis of screw flight 6a is rotated 20° below the center line of axes of screw flights 6a and 6b, lifter 57b is at position 1. When the axis of screw flight 6a is rotated upward to a position 10° below the center line, lifter 57b is at position 2. When the axis of screw flight 6a is on the center line, lifter 57b is at position 3. Positions of lifter 57b are similarly shown at 10°, 20°, 30°, 40°, 50° and 60° above the center line at positions 4 through 9 respectively. Thus as lifter 57b moves through positions 1 to 9 the tumbling or paddle action occurs increasing the efficiency of the calciner through improved exposure of the material being processed to the heat of the calciner.

Figure 10:
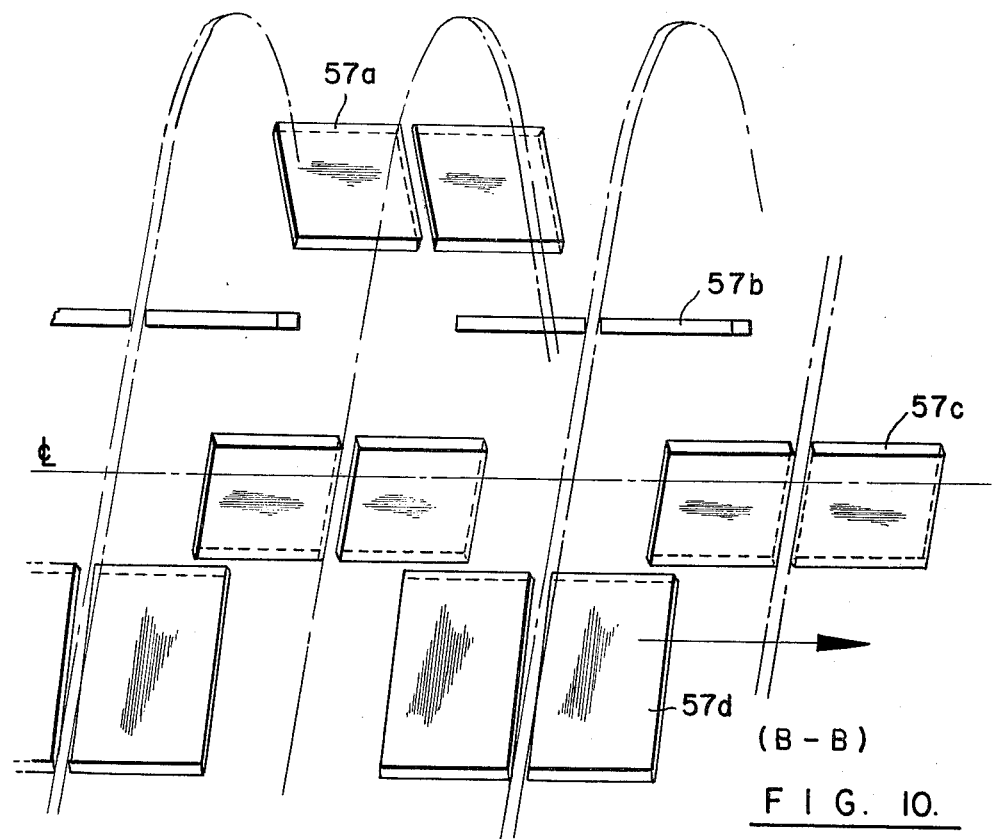
FIG. 10 is a longitudinal sectional view of a portion of a conveyor screw taken along line B—B of FIG. 9.
Figure 11:
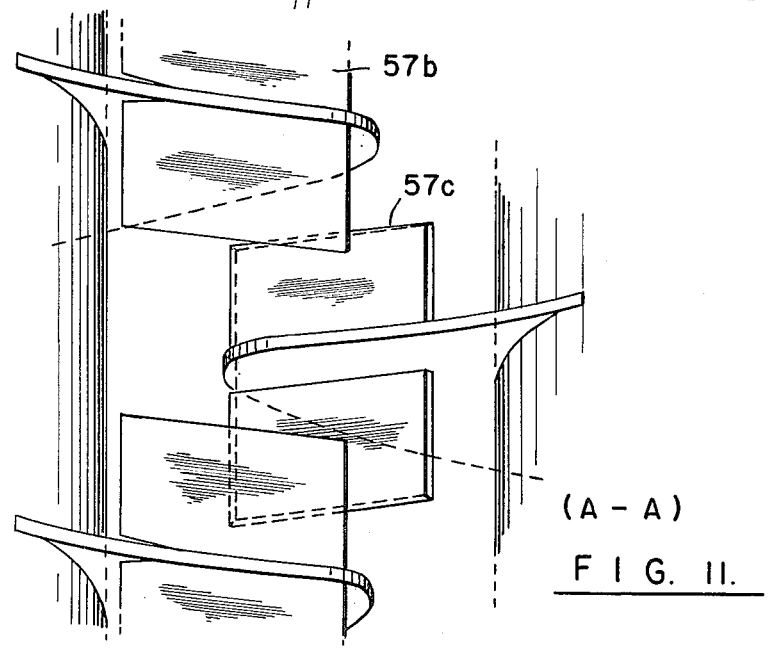
FIG. 11 is a longitudinal sectional view of portions of conveyor screws taken along line A—A of FIG. 9.

FIG. 10 is a schematic side view of lifters 57a, 57b, 57c and 57d taken along line B—B of FIG. 9 when the axes of screw flights 6a and 6b are at the center line and further shows the relative positions of the lifters. FIG. 11 is a top view of lifters 57b,57c taken along line A—A of FIG. 9 and shows the relative positions and intermeshing of the lifters and screw flights.

Figure 12:
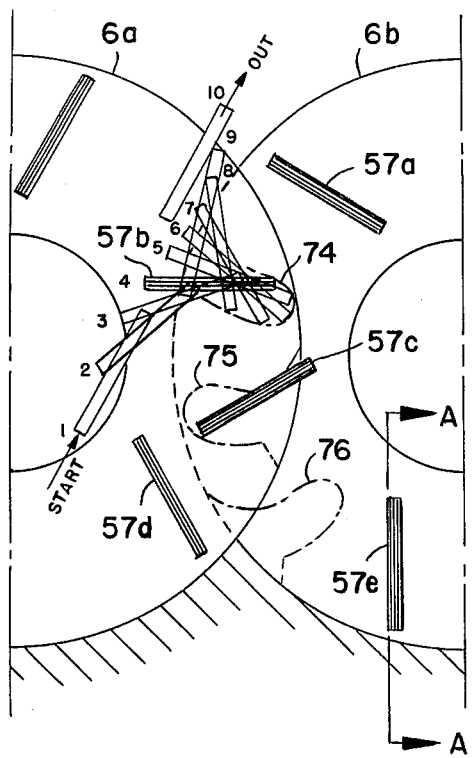
FIG. 12 is a cross sectional view of conveyor screws in accordance with the invention showing schematically the relative motion of the lifters at the flight overlap.
Figure 13:
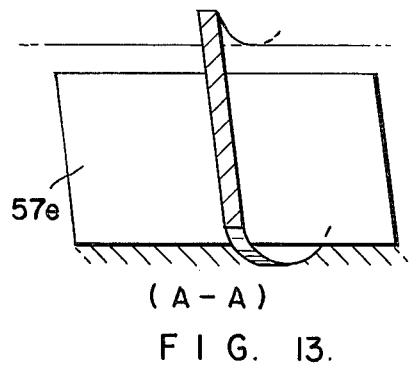
FIG. 13 is a side view of a portion of a conveyor screw taken along line A—A of FIG. 12.

FIG. 12 shows the relative motion of lifter 57b in a manner similar to that of FIG. 9 with the axis of screw flight 6a being rotated about the axis of screw flight 6b. In FIG. 12 screw flight 6a is rotated from a point 30° below the center line of the axes of screw flights 6a and 6b to a point 60° above the center line of the axes of screw flights 6a and 6b with the position of lifter 57b at each 10° interval. As the axis of screw flight 6a is rotated through 90° about the axis of screw flight 6b, lifter 57b rotates through 180°. The path of lifter 57b at the flight overlap falls within the area bounded by line 74. The paths of lifters 57c and 57d at the flight overlap are within the areas bounded by lines 75 and 76 respectively. This clearly evidences the tumbling, paddle-type action produced by the lifters of the invention. FIG. 13 is a side view of lifter 57c on screw flight 6b taken along line A—A of FIG. 12.

Figure 15:
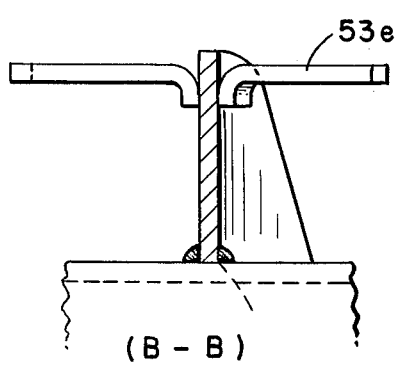
FIG. 15 is a side view of a portion of a conveyor screw taken along line B—B of FIG. 14.
Figure 14:
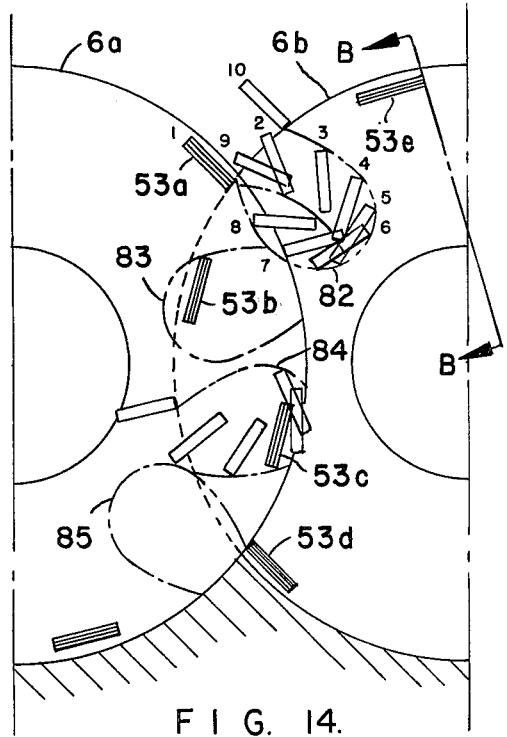
FIG. 14 is a cross sectional view of conveyor screws in accordance with the invention showing schematically the relative motion of the scrapers at the flight overlap.

FIG. 14 shows the relative motion of scrapers 53a and 53c at the flight overlap as the axis of screw flight 6a is rotated about the axis of screw flight 6b from a position at the centerline of screw flights 6a and 6b to a point 90° above the centerline. As screw flight 6a rotates through 90°, scraper 53a rotates through 180° and forms the path shown by line 82 at the flight overlap. The paths of scrapers 53b, 53c and 53d at the flight overlap are shown by lines 83, 84 and 85 respectively. This clearly demonstrates the cleaning action produced by the scrapers of the invention. FIG. 15 is a side view of scraper 53e on screw flight 6b taken along line B—B of FIG. 14.

Scrapers 53 and lifters 57 may be of any rigid material which can withstand calciner processing temperatures; a preferred material is high-temperature alloy stainless steel.

Scrapers 53 and lifters 57 may be mounted on the conveyor screw flights by any standard mounting method, such as welding, bolting, riveting or other methods known to those skilled in the art. The preferred method of mounting the scrapers and lifters on the conveyor screw is by welding.

In the calciner disclosed in U.S. Pat. No. 4,256,453 an electronic counter is preferably connected to a hydraulic screw reversing drive to selectively advance and then reverse the path of the material in the calciner so as to increase the residence time of the material therein to expose fresh particle surfaces for calcining with the overall sequence resulting in advancement of the material to exit port 46. In the calciner according to the present invention, such selective advancement and reversing of the path of the material in the calciner is no longer necessary due to the high efficiency of the calciner where scrapers or lifters or both are mounted on the screw flights of the conveyor screws.

Those skilled in the art will be able to fashion equivalent members and means for the various structural members disclosed herein. For instance, those skilled in the art will be able to devise other shapes for the lifters and scrapers and various alignments of the lifters and scrapers which are within the spirit of the invention. All such equivalent means and members are intended to be covered by the scope of the appended claims.

We claim:

1. A calciner comprising
   (a) a heat source for heating a material,
   (b) a screw type conveyor arranged to convey said material while exposed to said heat source, said conveyor having at least one pair of mated conveyor screws, each said conveyor screw comprising a shaft having screw flights attached thereto, the flight pitch of one screw in the pair being opposite from that of the other screw in the pair, the screws of each pair intermeshing with each other and rotating in opposite directions to advance material to and through said calciner,
   (c) scraper means attached to said screws and rotating therewith for preventing agglomeration of said material in said conveyor and adherence of said material on said conveyor screw flights and shafts and for absorbing heat from said heat source and conducting said heat to said material, and
   (d) lifter means attached to said screws and rotating therewith for moving said material from beneath said shaft upward for contact with heat from said heat source, for mixing and cascading said material downward and for absorbing heat from said heat source and conducting said heat to said material.

2. A calciner as defined in claim 1, wherein said scraper means comprise multiple substantially rigid members extending axially outwardly from said screw flights, near the periphery of said screw flights, mounted on at least that portion of said screw flights where said material enters said conveyor.

3. A calciner as defined in claim 2, wherein said rigid members are substantially flat plates.

4. A calciner as defined in claim 2, wherein said rigid members comprise high temperature alloy stainless steel.

5. A calciner as defined in claim 2, wherein each said rigid member extends about one third the pitch of said screw flights.

6. A calciner as defined in claim 2, wherein each said rigid member is about $\frac{1}{8}''$ to about 3/16'' thick.

7. A calciner as defined in claim 2, wherein each said rigid member comprises from about 10° to about 14° of the circumference of said conveyor screw.

8. A calciner as defined in claim 2, wherein each said rigid member comprises from about 11° to about 13° of the circumference of said conveyor screw.

9. A calciner as defined in claim 2, wherein said rigid members are spaced at about 60° intervals on said screw flights.

10. Calciner as defined in claim 2, wherein said rigid members are spaced about ⅛" from said screw flight outer edge.

11. A calciner as defined in claim 2, wherein said conveyor screws intermesh such that the rigid members on one conveyor screw rotate free of the rigid members on the other screw.

12. A calciner comprising
(a) a heat source for heating a material,
(b) a screw type conveyor arranged to convey said material while exposed to said heat source, said conveyor having at least one pair of mated conveyor screws, each said conveyor screw comprising a shaft having screw flights attached thereto, the flight pitch of one screw in the pair being opposite from that of the other screw in the pair, the screws of each pair intermeshing with each other and rotating in opposite directions to advance material to and through said calciner,
(c) lifter means attached to said screws and rotating therewith for moving said material from beneath said shaft upward for contact with heat from said heat source, for mixing and cascading said material downward and for absorbing heat from said heat source and conducting said heat to said material, wherein said lifter means comprise multiple substantially rigid members extending outwardly from said screw flight, extending in a direction substantially tangential to said conveyor screw shaft inner circumference, spaced from said conveyor screw shaft mounted on at least that portion of said screw flights where said material exits said calciner.

13. A calciner as defined in claim 12, wherein said rigid members are substantially flat plates.

14. A calciner as defined in claim 12, wherein said rigid members comprise high temperature alloy stainless steel.

15. A calciner as defined in claim 12 wherein said rigid members are spaced at about 60° intervals on said screw flights.

16. A calciner as defined in claim 12, wherein said rigid members are spaced about ⅛" from said screw flight outer edge.

17. A calciner as defined in claim 12, wherein said rigid members are spaced about ¼" to about 1" from said screw shaft.

18. A calciner as defined in claim 12 wherein said rigid members extend about one third the pitch of said screw flights.

19. A calciner as defined in claim 12, wherein said rigid members are about ⅛" to about 3/16" thick.

* * * * *